(12) United States Patent
Kabir et al.

(10) Patent No.: US 9,611,935 B2
(45) Date of Patent: Apr. 4, 2017

(54) LIGHT COMPOSITE PISTON

(71) Applicant: GE Oil & Gas Compression Systems, LLC, Houston, TX (US)

(72) Inventors: Omar M. Kabir, Waller, TX (US); John C. Bartos, Magnolia, TX (US); Kent Pearl, Katy, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 770 days.

(21) Appl. No.: 13/674,925

(22) Filed: Nov. 12, 2012

(65) Prior Publication Data

US 2014/0130664 A1 May 15, 2014

(51) Int. Cl.
*F16J 1/00* (2006.01)
*F16J 1/01* (2006.01)

(52) U.S. Cl.
CPC .............. *F16J 1/01* (2013.01); *F16J 1/005* (2013.01); *F16J 1/006* (2013.01)

(58) Field of Classification Search
CPC ...... F02F 3/0015; F02F 3/0076; F02F 3/0023; F02F 2003/0007; F16J 1/01; F16J 1/005; F16J 1/006; F16J 1/001; F16J 1/12; F16J 7/00
USPC ......... 92/249, 172, 212, 248, 224, 254, 258, 92/246, 59, 165 R, 201, 202, 203, 204, 92/205, 206, 207, 255, 256, 257
See application file for complete search history.

(56) References Cited

U.S. PATENT DOCUMENTS

| | | | |
|---|---|---|---|
| 499,064 A * | 6/1893 | Vauclain .................. F16J 1/12 29/898.059 |
| 940,068 A * | 11/1909 | Robinson ................. F16J 1/006 92/185 |
| 1,355,519 A | 10/1920 | Wagner |
| 1,388,254 A | 8/1921 | Hansen |
| 2,460,948 A * | 2/1949 | Sander .................. F04B 53/143 92/258 |
| 2,793,089 A * | 5/1957 | Anderson ............. F04B 39/042 277/434 |
| 3,074,769 A * | 1/1963 | Fahlman et al. ............... 277/456 |
| 3,149,543 A * | 9/1964 | Naab .......................... F16J 9/28 277/434 |
| 3,155,014 A * | 11/1964 | Genz .......................... F16J 1/02 92/158 |
| 3,636,824 A * | 1/1972 | Clark .............................. 92/249 |
| 3,930,472 A * | 1/1976 | Athenstaedt ........ F02B 23/0696 123/41.37 |
| 4,008,051 A * | 2/1977 | Cadle ............................ 428/553 |

(Continued)

FOREIGN PATENT DOCUMENTS

GB 2174730 11/1986

OTHER PUBLICATIONS

PCT International Search Report and Written Opinion for PCT/2013/065994 mailed Feb. 17, 2014.

(Continued)

*Primary Examiner* — Michael Leslie
*Assistant Examiner* — Dustin T Nguyen
(74) *Attorney, Agent, or Firm* — Mintz Levin Cohn Ferris Glovsky and Popeo, P.C.

(57) ABSTRACT

A system, in certain embodiments, includes a composite piston. The composite piston comprises a piston body made of a composite material, wherein the composite material comprises a reinforcing material distributed in a matrix material.

20 Claims, 6 Drawing Sheets

(56) References Cited

U.S. PATENT DOCUMENTS

| | | | |
|---|---|---|---|
| 4,073,221 A * | 2/1978 | Goloff | F02F 3/0023 92/220 |
| 4,306,489 A * | 12/1981 | Driver et al. | 92/212 |
| 4,683,810 A * | 8/1987 | Afimiwala | F04B 5/00 403/267 |
| 5,052,275 A | 10/1991 | Mayer | |
| 5,284,084 A * | 2/1994 | Pippert | E21B 21/01 92/241 |
| 5,878,652 A * | 3/1999 | Kottke | 92/258 |
| 6,199,369 B1 * | 3/2001 | Meyer | F02B 75/225 60/39.6 |
| 6,675,699 B1 * | 1/2004 | Pippert | F04B 53/143 92/254 |
| 2002/0018725 A1 | 2/2002 | Ota et al. | |
| 2010/0206553 A1 | 8/2010 | Bailey et al. | |
| 2010/0307446 A1 * | 12/2010 | Nodl | 123/193.6 |

OTHER PUBLICATIONS

PCT Search Report and Written Opinion issued in connection with corresponding PCT Application No. PCT/US2013/069507 on Feb. 17, 2014.
Australian Search Report issued in connection with related AU Application No. 2013342092 on Jul. 21, 2016.

* cited by examiner

LIGHT COMPOSITE PISTON

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A piston is a disk or cylinder that moves within a close-fitting cylinder of a mechanical assembly. The piston within the cylinder operates to transfer force from a working fluid to a crankshaft, or vice versa. The piston may include a crosshead designed to reduce or eliminate sideways, or radial, pressure on the piston during operation. For example, mechanical assemblies such as engines, pumps, and compressors include cylinders with reciprocating pistons. In engines, the piston moves in response to a fluid pressure resulting from combustion of a fuel. More specifically, the force from the fluid pressure is transferred to the piston, which further transfers the force to a crankshaft. Conversely, pumps and compressors include pistons for compressing or ejecting a fluid within a respective cylinder. The pump or compressor includes a crankshaft which transfers force from the piston to a working fluid, such that the working fluid is compressed within or displaced from the cylinder. Unfortunately, the speed of the piston and crosshead, and therefore the flow capacity of the mechanical assembly, may be limited by the construction of the piston.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
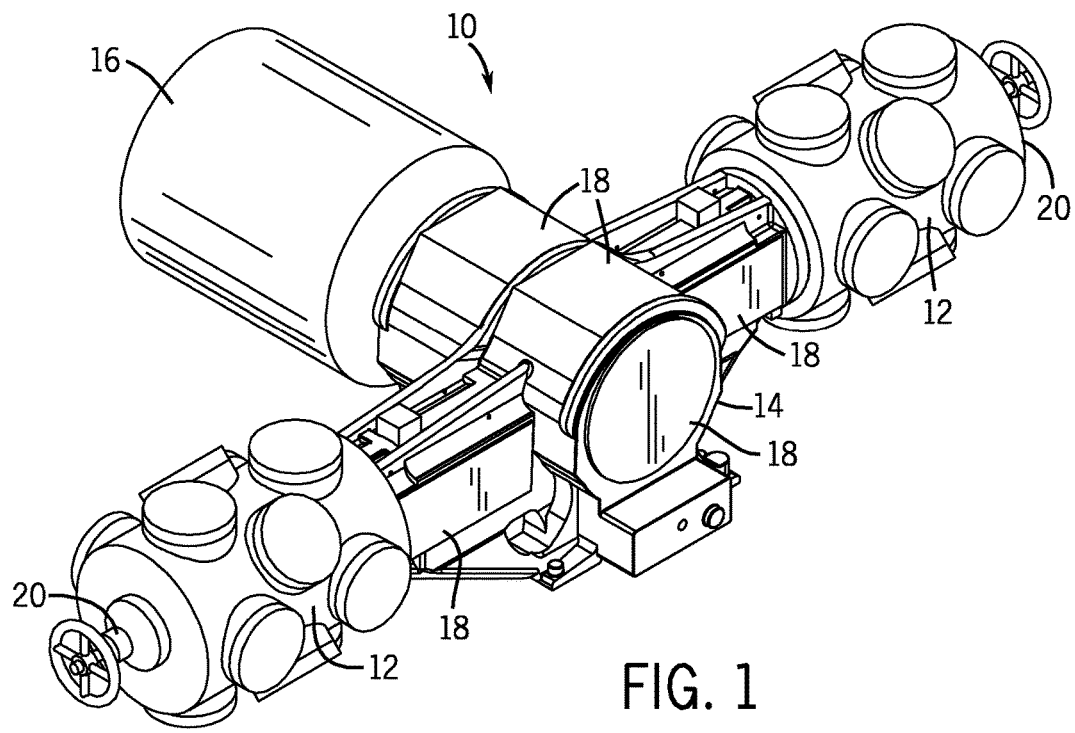
FIG. 1 is a perspective view of a reciprocating compressor including a light composite crosshead and/or a light composite piston in accordance embodiments of the present disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain embodiments of the present disclosure include a piston constructed of a lightweight composite material or other lightweight material. For example, the lightweight composite material may be a material formed from a matrix material and a reinforcing material. For example, the reinforcing material may include particles, fibers, or the like, distributed throughout the matrix material. In other embodiments, the lightweight composite material may include metal components and non-metal components. The piston may be configured for use in a reciprocating compressor, engine, pump, or the like. In certain embodiments, the lightweight composite piston may have a single piece design or a multi-piece design. In embodiments of the lightweight composite piston having a multi-piece design, the piston may comprise two hollow piston halves, each having one or more internal stiffening ribs configured to increase strength of the piston. Embodiments of the lightweight composite piston further include a piston ring carrier configured to receive and support a piston ring. As will be appreciated, a piston ring may serve to provide a gas-tight seal between the piston and the piston cylinder as the piston moves within the piston cylinder. Additionally, certain embodiments may include a piston rod constructed of a composite material. As discussed in detail below, the lightweight composite piston may be constructed from a variety of lightweight materials. Advantageously, the lightweight material construction of the piston allows the piston to be operated at higher speeds. In this manner, the compressor, pump, engine, or other machine operating the piston may realize a larger flow capacity without increasing the size of the piston cylinder. Additionally, the lightweight construction may provide additional benefits, as discussed below.

Additionally, certain embodiments of the present disclosure include a crosshead constructed of a lightweight composite material or other lightweight material. For example, the lightweight composite material may be a material formed from a matrix material and a reinforcing material (e.g., particles or fibers distributed throughout the matrix material). In other embodiments, the lightweight composite material may include metal components and non-metal components. The crosshead may be configured for use in a reciprocating compressor, engine, pump, or the like. In certain embodiments, the light composite crosshead may also include a crosshead pin made of a light composite material. Embodiments of the light composite crosshead pin may be configured to act as a bearing surface between the crosshead and a connecting rod. Specifically, the light composite crosshead pin may be configured to supply oil or other lubricant to crosshead, pin, and crankshaft surfaces. As discussed in detail below, the lightweight composite crosshead may be constructed from a variety of lightweight materials. Advantageously, the lightweight material construction of the crosshead allows the crosshead to be operated at higher speeds. In this manner, the compressor, pump, engine, or other machine operating the crosshead may realize a larger flow capacity without increasing the size of the piston cylinder. Additionally, the lightweight construction may provide additional benefits, as discussed below.

Furthermore, certain embodiments of the present disclosure include a crosshead lubrication system for a crosshead in a mechanical assembly, such as a compressor, engine, pump, or the like. For example, the crosshead lubrication system may include a crosshead and a crosshead pin (e.g., an annular crosshead pin) configured to receive a flow of a lubricant, such as oil, from a connecting rod and flow the lubricant to exterior or outer surfaces of the crosshead. For example, in one embodiment, the lubricant may flow from the connecting rod towards the crosshead and enter an annulus of the crosshead pin through entry ports. Thereafter, the lubricant may pass through exit ports of the crosshead pin and into lubricant ports of the crosshead. In this manner, the lubricant may reduce friction, abrasion, and/or wear between the crosshead and the crosshead pin. Moreover, the lubricant further flows through the lubricant ports of the crosshead, which extend from the crosshead pin (e.g., at an interior of the crosshead) to an exterior of the crosshead. More specifically, the lubricant ports of the crosshead extend to recesses formed in exterior or outer surfaces of the crosshead. As discussed in detail below, the outer surfaces of the crosshead translate along crosshead guides of the mechanical assembly (e.g., compressor). Consequently, as the lubricant exits the lubricant ports and flows within the recesses formed in the exterior surfaces of the crosshead, the lubricant may reduce friction, abrasion, and/or wear between the crosshead and crosshead shoes and/or the crosshead guides as the crosshead moves within the mechanical assembly.

Turning now to the figures, FIG. 1 is a perspective view of an exemplary compressor 10. In the illustrated embodiment, the compressor 10 includes a pair of compression cylinders 12 coupled to a frame 14. A variety of internal components may be disposed within the cylinders 12 and the frame 14 to enable compression of fluids introduced into the compressor 10. For example, as discussed in greater detail below, the cylinders 12 may include a crosshead formed from a composite material. In one embodiment, the compressor 10 may be utilized to compress natural gas. However, in other embodiments, the compressor 10 may be configured and/or utilized to compress other fluids.

A mechanical power source or driver 16, such as an engine or an electric motor, is coupled to the compressor 10 to provide mechanical power to the various internal components and enable compression of the fluid within the cylinders 12. To facilitate access to such internal components, as may be desired for diagnostic or maintenance purposes, openings in the frame 14 may be provided and selectively accessed via removable covers 18. Further, the cylinders 12 also include valve assemblies 20 for controlling flow of the fluid through the cylinders 12.

Although the exemplary compressor 10 shown is a two-throw reciprocating compressor, other compressors 10 may have alternative configurations. For instance, in other embodiments, the compressor 10 may include a different number of cylinder throws, such as a four-throw compressor, a six-throw compressor, a couple-free reciprocating compressor, a screw compressor, or the like. Further, other variations in the compressor 10 may include variations in the length of stroke, the operating speed, and the size, to name a few.

Figure 2:
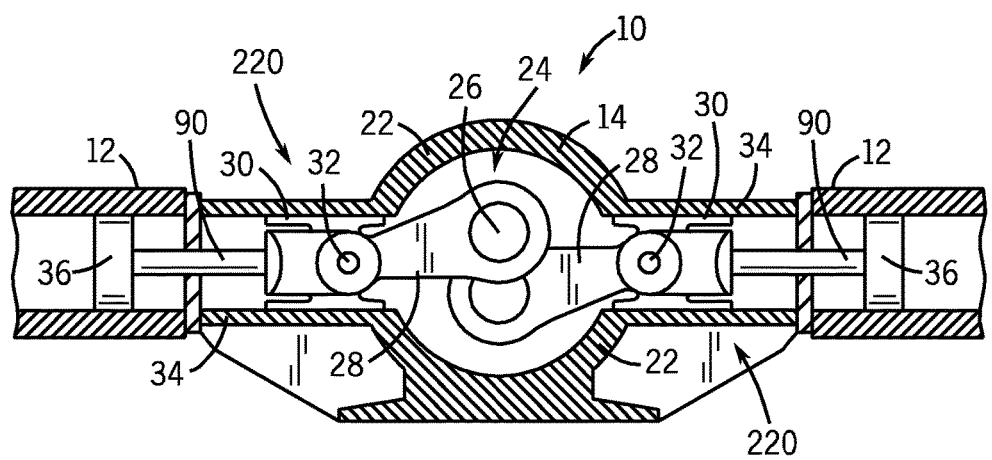
FIG. 2 is an axial cross-sectional view of the exemplary compressor of FIG. 1, including a light composite crosshead and/or a light composite piston, in accordance with embodiments of the present disclosure.

FIG. 2 is a cross-sectional view of the compressor 10, which illustrates a number of exemplary internal components of the compressor of FIG. 1. In the illustrated embodiment, the frame 14 of the compressor 10 includes a hollow central body or housing 22 that generally defines an interior volume 24 in which various internal components may be received, such as a crankshaft 26. In one embodiment, the central body 22 may have a generally curved or cylindrical shape. It should be noted, however, that the central body 22 may have other shapes or configurations.

In operation, the driver 16 rotates the crankshaft 26 supported within the interior volume 24 of the frame 14. In one embodiment, the crankshaft 26 is coupled to crossheads 30 via connecting rods 28 and crosshead pins 32. The crossheads 30 further couple the connecting rods 28 to piston rods 90. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body or housing 22, although other configurations are also envisaged. As will be appreciated, the rotational motion of the crankshaft 26 is translated via the connecting rods 28 to reciprocal linear motion of the crossheads 30 within the crosshead guides 34.

As discussed in further detail below, the crossheads 30 may have a lightweight construction. More specifically, certain components of the crossheads 30 may be formed from a lightweight composite material. As will be appreciated, the lightweight construction of the crossheads 30 may enable an operator to increase the speed of the compressor 10, thereby increasing the flow capacity of the compressor 10. Furthermore, the increased flow capacity of the compressor 10 with crossheads 30 formed from a composite material may be realized without increasing the size of the cylinders 12 of the compressor 10. As discussed below, the pins 32 of the crossheads 30 may also be made from a light composite material.

Furthermore, certain embodiments of the crossheads 30 and the pins 32 may include a crosshead lubrication system 220. For example, the crossheads 30 and the pins 32 may have features which enable the crossheads 30 and pins 32 to function as the crosshead lubrication system 220. More specifically, the crosshead lubrication system 220 is configured to route oil or other lubricant to bearing surfaces between the crossheads 30, connecting rods 28, and crosshead guides 34, crosshead shoes, and so forth. In this manner, friction, abrasion, and wear may be reduced within the compressor 10.

As noted above, the cylinders 12 are configured to receive a fluid for compression. The crossheads 32 are coupled to pistons 36 disposed within the cylinders 12, and the reciprocating motion of the crossheads allows compression of fluid within the cylinders 12 via the pistons 36. Particularly, as a piston 36 is driven forward (i.e., outwardly from central body 22) into a cylinder 12, the piston 36 forces the fluid within the cylinder into a smaller volume, thereby increasing the pressure of the fluid. A discharge valve of valve assembly 20 may then be opened to allow the pressurized or compressed fluid to exit the cylinder 12. The piston 36 may then stroke backward, and additional fluid may enter the cylinder 12 through an inlet valve of the valve assembly 20 for compression in the same manner described above.

Figure 3:
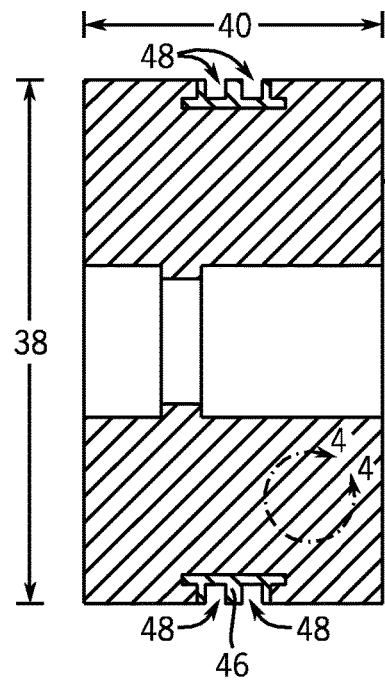
FIG. 3 is a cross-sectional side view of a light composite piston, in accordance with embodiments of the present disclosure.

FIG. 3 is a cross-sectional side view of an exemplary piston 36, which may also be formed from a lightweight composite material or other lightweight material. In the illustrated embodiment, the piston 36 has a generally cylindrical shape, with a diameter 38 and a height 40 (e.g., axial length). Furthermore, the piston 36 has a single piece design. In other words, the piston 36 is formed from a single composite body 42 constructed from a lightweight composite material or other lightweight material. As mentioned above, the composite material may include a matrix material and a reinforcing material. For example, the lightweight composite material may be a carbon composite, a fiberglass composite, or other lightweight composite material. Additionally, other lightweight materials may be used, such as a plastic, a ceramic, a polyimide, a polyetheretherketone (PEEK), an elastomer such as SA4, or other lightweight materials. The composite and/or lightweight construction of the piston 36 may prevent the piston 36 from undergoing material corrosion due to corrosive gases that the piston 36 may contact. For certain applications, the lightweight composite material or other lightweight material may be configured to withstand a minimum radial pressure of approximately 100 to 500, 150 to 450, 200 to 400, or 300 to 350 MPa. Additionally, the piston 36 may be configured for minimal diametrical expansion at a maximum operating temperature. In other words, the piston 36 may be constructed from a lightweight composite material or other lightweight material that may limit the expansion of the diameter 38 of the piston at a specified temperature. For example, the lightweight composite material or other lightweight material may be selected such that the piston 36 undergoes diametrical expansion of less than approximately 0.001 to 0.003, 0.0015 to 0.0025, or 0.0018 to 0.0022 mm at a temperature of approximately 150 to 200, 160 to 190, or 170 to 180 degrees C.

Furthermore, a variety of processes may be used to form the single composite body 42 of the piston 36. In certain embodiments, the single composite body 42 may be compressed, molded, or machined. As shown, the single composite body 42 of the piston 36 includes a bore 44. As with the single composite body 42, the bore 44 may be formed using a variety of processes. For example, in embodiments where the single composite body 42 is molded, the mold used to form the single composite body 42 may be configured to form the bore 44 during the molding process. Alternatively, in embodiments where the single composite body 42 is machined, the bore 44 may be formed by a machining process such as drilling. The bore 44 is configured to receive a piston connecting rod to couple the piston 36 to the crankshaft.

The piston 36 also includes a piston ring carrier 46 configured to receive one or more piston rings. As will be appreciated, pistons rings disposed within the piston ring carrier 46 serve to create a gas-tight connection when the piston 36 is disposed within a piston cylinder. The piston ring carrier 46 may be formed from a metal, such as steel. In the illustrated embodiment, the piston ring carrier 46 includes two annular grooves 48, where each groove 48 is configured to receive a single piston ring. In other embodiments the piston ring carrier 46 may include 1, 3, 4, 5, or more grooves 48. The single composite body 42 and the piston ring carrier 48 are integrally formed. For example, for a piston 36 formed by a molding process, the piston ring carrier 48 may be placed in a mold used to form the piston 36. Thereafter, the lightweight composite material or other lightweight material is poured into the mold, and the lightweight composite material or other lightweight material molds with the piston ring carrier 48 to create the integrally formed piston 36.

Figure 4:
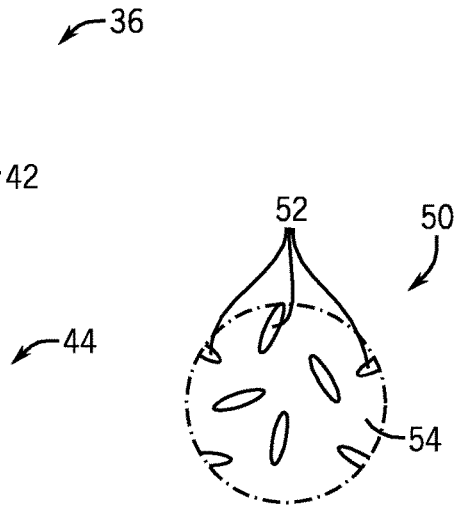
FIG. 4 is a partial cross-sectional view taken within line 4-4 of FIG. 3, illustrating an embodiment of the composite material having a reinforcing material distributed within a matrix material.

FIG. 4 is a partial cross-sectional view, taken within line 4-4 of FIG. 3, illustrating an embodiment of a composite material 50 having a reinforcing material 52 distributed within a matrix material 54. As shown, the matrix material 54 is a base material that holds the reinforcing material 52. In other words, the matrix material 54 surrounds and supports the reinforcing material 52. For example, the matrix material may be a plastic, polymer, polyester, epoxy, polyimide, polyetheretherketone (PEEK), polypropylene, or other matrix material. The reinforcing material 52 is distributed throughout the matrix material 54 and may serve to enhance the physical and/or mechanical properties of the composite material 50. For example, the reinforcing material may be fibers or other particles, such as carbon, glass, ceramics, or other reinforcing material. As will be appreciated, the ratio of matrix material 54 to reinforcing material 52 may vary for different composite materials 50. For example, the ratio of matrix material 54 to reinforcing material 52 may be approximately 10:1 to 1:10, 5:1 to 1:5, 3:1 to 1:3, 2:1 to 1:2, or 1:1.

Figure 5:
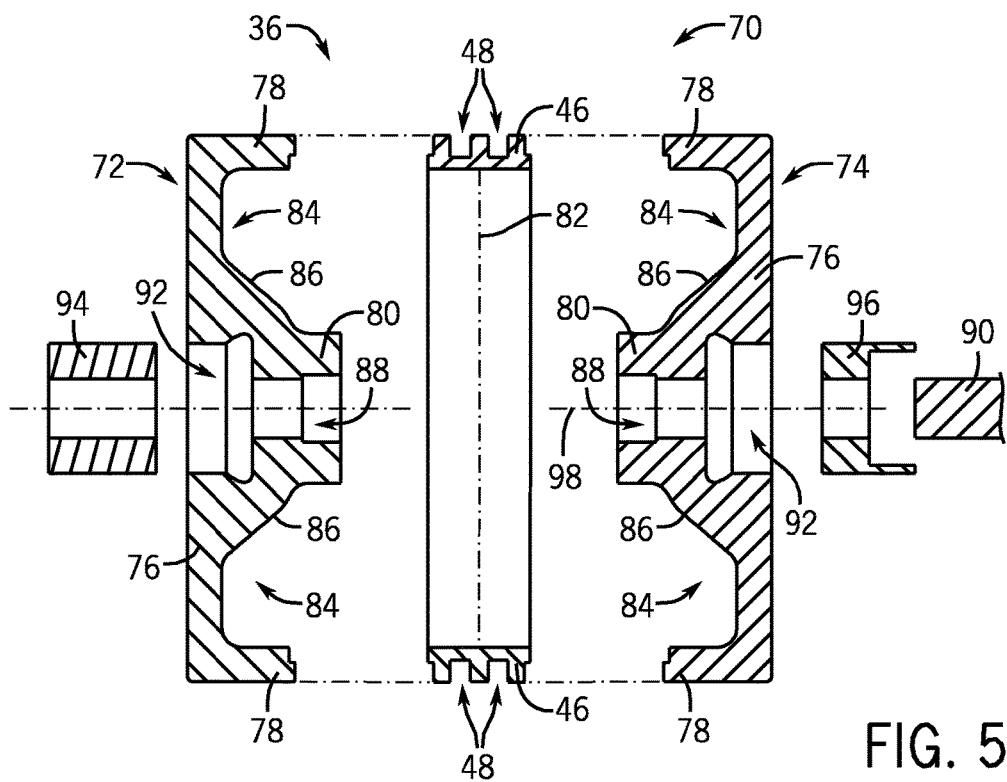
FIG. 5 is an exploded view of a light composite piston assembly, in accordance with embodiments of the present disclosure.

FIG. 5 is an exploded side view of a light composite piston assembly 70, illustrating a piston 36 having a multi-part configuration. Specifically, in the illustrated embodiment, the piston 36 includes two body portions, a first body portion 72 and a second body portion 74, each formed from a lightweight composite material or other lightweight material. As mentioned above, the lightweight composite material or other lightweight material may be a carbon composite, a plastic, a ceramic, a fiberglass composite, a polyimide, a polyetheretherketone (PEEK), an elastomer such as SA4, or other lightweight composite material. As with the single composite body 42, the first and second body portions 72 and 74 may be formed using a variety of manufacturing processes. For example, the first and second body portions 72 and 74 may be formed using a molding process or a machining process. Furthermore, in the illustrated embodiment, the first and second body portions 72 and 74 are substantially identical. As a result, the manufacturing of the piston 36 may be simplified and streamlined. For example, in embodiments where the first and second body portions 72 and 74 are formed using a molding process, a single mold may be used to form each of the first and second body portions 72 and 74. In other embodiments of the multi-part piston 36, the first and second body portions 72 and 74 may not be identical. In other words, the first and second body portions 72 may have uniquely different configurations.

As shown, each of the first and second body portions 72 and 74 include a base portion 76, an outer lip 78 and an inner hub 80. The outer lip 78 and the inner hub 80 extend axially from the base portion 76 toward a central radial axis 82 of the piston 36. In certain embodiments, the outer lip 78 and the inner hub 80 may each have an annular configuration. Between the outer lip 78 and the inner hub 80 is an annular cavity 84. As will be appreciated, the annular cavity 84 of each of the first and second body portions 72 and 74 provides a lighter weight design of the piston 36. In embodiments where the first and second body portions 72 and 74 are formed using a molding process, the mold used to form the first and second body portions 72 and 74 may be configured to form the annular cavity 84. Alternatively, the annular cavity 84 may be formed by a machining process such as milling or turning. Each of the first and second body portions 72 and 74 further includes ribs 86 extending between the base portion 76 and the inner hub 80. The ribs 86 provide additional structural support for the first and second body portions 72 and 74 and the piston 36 as a whole. As with the annular cavity 84, the ribs 86 may be formed with a mold or with a machining process. Each of the first and second body portions 72 and 74 may include 1 to 10, 2 to 8, or 3 to 4 ribs 86.

The inner hub 80 of each of the first and second body portions 72 and 74 includes an aperture 88 configured to receive the piston rod 90. Specifically, the aperture 88 extends through inner hub 80 and the base portion 76 of each of the first and second body portions 72 and 74. Furthermore, the aperture 88 includes a recess 92 formed in the base portion 76 of each of the first and second body portions 72 and 74. The apertures 88 and recesses 92 may be formed in the respective first and second body portions 72 and 74 using a machining process such as drilling or using a molding process. As discussed below, the recess 92 formed in the first body portion 72 is configured to receive a piston rod nut 94. Specifically, when the piston assembly 70 is assembled, the piston rod nut 94 is received by the recess 92 of the first body portion 72 and is coupled to the piston rod 90, thereby partially securing the piston rod 90 to the piston 36. Similarly, the recess 92 of the second body portion 74 is configured to receive a piston rod washer 96. When the piston rod assembly 70 is assembled, the piston rod washer 96 is disposed about the piston rod 90 and is disposed within the recess 92 of the second body portion 74, thereby limiting radial movement of the piston rod 90 with respect to the piston 36.

In the illustrated embodiment, piston ring carrier 46 is disposed between the first and second body portions 72 and 74. As discussed below, when the piston assembly 70 is assembled, the piston ring carrier 46 abuts and is disposed between the outer lips 78 of the first and second body portions 72 and 74. Additionally, when the piston assembly 70 is assembled, the inner hubs 80 of the first and second body portions 72 and 74 abut one another. Specifically, the apertures 88 and the recesses 92 of the respective first and second body portions 72 and 74 will be operatively connected for receiving the piston rod 90 along a central axis 98 of the piston 36.

Figure 6:
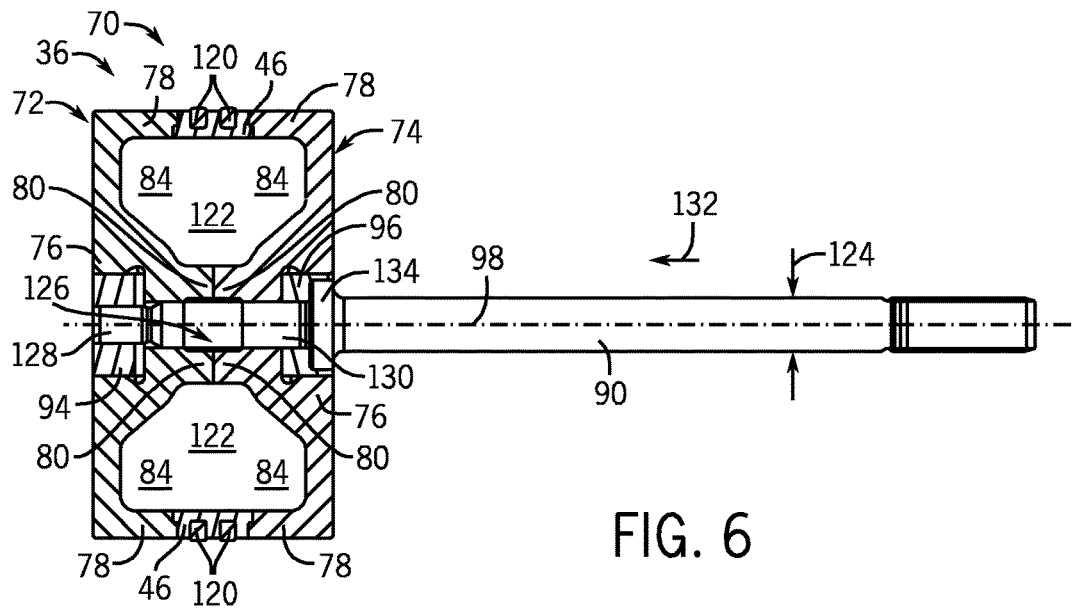
FIG. 6 is a cross-sectional side view of the light composite piston assembly of FIG. 5, in accordance with embodiments of the present disclosure.

FIG. 6 is a cross-sectional side view of the piston assembly 70 of FIG. 4, illustrating the assembled piston assembly 70. The illustrated embodiment includes similar elements and element numbers as the embodiment shown in FIG. 5. As mentioned above, when the piston assembly 70 is assembled, the piston ring carrier 46 is axially captured between the first and second body portions 72 and 74. Specifically, the piston ring carrier 46 abuts and is axially captured between the outer lips 78 of each of the first and second body portions 72 and 74. In the illustrated embodiment, pistons rings 120 are disposed within the grooves 48 of the piston ring carrier 46. As discussed above, the piston rings 120 serve to create an air-tight seal between the piston 36 and a piston cylinder in which the piston 36 operates. The piston ring carrier 46 and the first and second body portions 72 and 74 are coupled together to form the piston 36. As mentioned above, the inner hubs 80 of each of the first and second body portions 72 and 74 abut one another. Additionally, the annular cavities 84 of each of the first and second body portions 72 and 74 are joined to form hollow portions 122 of the piston 36. As will be appreciated, the hollow portions 122 of the piston 36 enable a light weight configuration of the piston 36. The light weight configuration of the piston 36 allows the piston 36 to be operated at higher speeds than pistons formed using conventional designs. As a result, the piston cylinder containing the piston 36 may realize a larger flow capacity without increasing the size of the piston cylinder. Additionally, the light weight design of the piston 36 reduces the inertial load of the piston, which may increase the longevity of the piston 36.

As shown, the piston rod 90 is coupled to the piston assembly 70. The piston rod 90 has a diameter 124 which may be approximately 10 to 500, 20 to 400, 30 to 300, 40 to 200, or 50 to 100 mm. A first end 126 of the piston rod 90 is coupled to the piston assembly 70. Specifically, the first end 126 is received by the apertures 88 of the first and second body portions 72 and 74 of the piston 36. As mentioned above, the piston rod nut 94 is disposed within the recess 92 of the first body portion 72, and is coupled to a portion 128 of the first end 126 of the piston rod 70. For example, the portion 128 of the piston rod 90 and the piston rod nut 94 may each be threaded and configured to engage with one another. Specifically, when the piston rod nut 94 is disposed within the recess 92 of the first body portion 72, the piston rod nut 94 is held stationary. In other words, the piston rod nut 94 may have a configuration, such as a polygonal configuration, whereby the piston rod nut 94 may not rotate about the central axis 98 of the piston 36 when the piston rod nut 94 is disposed within the recess 92 of the first body portion 72. Subsequently, the first end 128 of the piston rod 90 may be placed through the apertures 88 of the first and second body portions 72 and 74, and the piston rod 90 may be rotated about the central axis 98. In this manner, the threads of the portion 128 of the piston rod 90 and the threads of the piston rod nut 94 may engage, thereby coupling the piston rod 90 to the piston rod nut 94.

Similarly, the piston rod washer 96 is disposed about a portion 130 of the first end 126 of the piston rod 70 and within the recess 92 of the second body portion 74 of the piston 36. As the portion 128 of the piston rod 90 is coupled to the piston rod nut 94, e.g., by rotating the piston rod 90 about the central axis 98, the piston rod 90 is translated in a direction 132. As a result, a flange 134 of the portion 130 of the piston rod 90 axially abuts the piston rod washer 96, which is disposed in the recess 92 of the second body portion 74. In this manner, the piston rod 90 couples the piston rod nut 94, the piston ring 46, the first and second body portions 72 and 74, and the piston rod washer 96 to form the piston 36.

Figure 7:
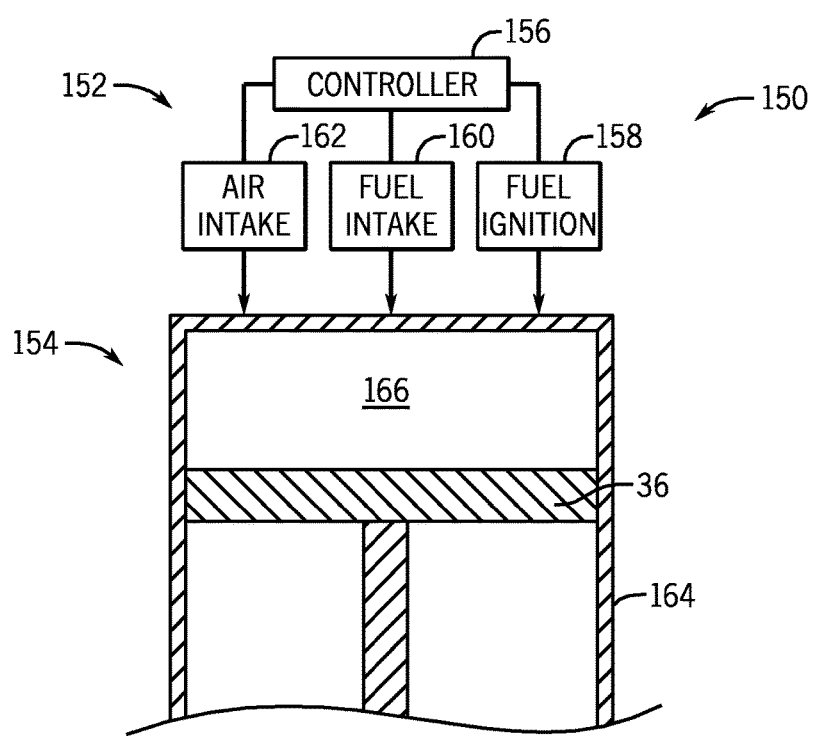
FIG. 7 is a schematic of an exemplary piston cylinder system including a light composite piston, in accordance with embodiments of the present disclosure.

FIG. 7 is a schematic of an exemplary piston cylinder system 150 including a light composite piston 36. As discussed above, the light composite piston 36 may be used in a variety of applications, such as compressors, pumps, and engines. For example, the piston cylinder system 150 of FIG. 7 may be used in a combustion engine. The illustrated embodiment of the piston cylinder system 150 includes a fuel injection system 152 coupled to a combustion chamber 154. The fuel injection system 152 includes a controller 156 coupled to a fuel ignition 158, a fuel intake or supply 160, and an air intake or supply 162. The controller is configured to control the quantity and timing of fuel injection and fuel ignition via the fuel intake 160 and the fuel ignition 158 in conjunction with the quantity and timing of air supply into the combustion chamber 154.

As illustrated, the combustion chamber 154 includes a piston 36 disposed in a cylinder 164. The piston 36 may be an embodiment of the light composite piston 36 described above. For example, the piston 36 may comprise a single composite body 42 formed from a lightweight composite material or other lightweight material. Alternatively, the piston 36 may be formed form first and second body portions 72 and 74 formed from a lightweight composite material or other lightweight material. Other embodiments of the piston 36 may include three or more body portions formed from a lightweight composite material or other lightweight material. As the piston 36 moves upward within the cylinder 164, the piston 36 compresses a combustion volume 166 having the air and eventually fuel from the intakes 162 and 160. For example, the fuel intake 160 may inject the fuel at one or more times during the upward stroke of the piston 36 as the piston approaches a top dead center position. At this point, the fuel air mixture is at an elevated pressure and an elevated temperature due to the compression by the piston 22. At an appropriate timing, the fuel ignition ignites the fuel-air mixture to generate hot pressurized combustion gases, which drive the piston 36 away from the top dead center position.

Figure 8:
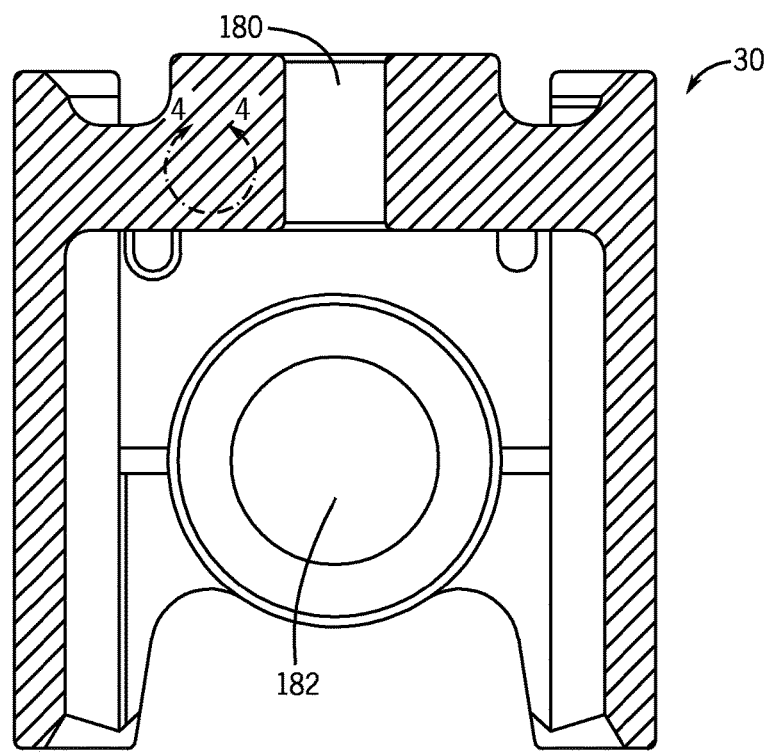
FIG. 8 is a side view of a light composite crosshead, in accordance with embodiments of the present disclosure.

FIG. 8 is a cross-sectional side view of an embodiment of the crosshead 30, which may be formed from a light composite material or other lightweight material. As mentioned above, the crosshead 30 is configured to couple the connecting rod 28 to the piston rod 33, thereby transferring energy from the piston 36 and piston rod 33 to the connecting rod 28 and the crankshaft 28. In the illustrated embodiment, the crosshead 30 has a crosshead body 178 having a single-piece configuration.

In the illustrated embodiment, the crosshead 30 has a first aperture 180 configured to receive the piston rod 90. For example, the piston rod 90 may be coupled to the crosshead 30 within the first aperture 180 using bolts, nuts, pins, or other clamping means. Additionally, the crosshead 30 has a second aperture 182, which may be used to couple the crosshead 30 to the connecting rod 28. Specifically, the second aperture 182 of the crosshead 30 may be aligned with an aperture or opening in the connecting rod 28, and the pin 32 may be disposed within the aperture 182 of the crosshead 30 and the aperture in the connecting rod 28, thereby coupling the crosshead 30 to the connecting 28. In this manner, the crosshead 30 and the connecting rod 28 may pivot relative to one another, while transferring energy from the piston rod 90 to the connecting rod 28.

As mentioned above, the crosshead 30 may be formed form a lightweight composite material or other lightweight material. For example, as mentioned above, the crosshead 30 has a single-piece configuration, and therefore may be formed from a single lightweight composite material or other lightweight material. In other embodiments, the crosshead 30 may have a multi-piece design and may be formed using multiple lightweight and/or lightweight composite materials. The crosshead 30 may be formed from lightweight materials such as a ceramic, a matrix-reinforced material, carbon fibrous materials, a polyimide, a polyetheretherketone (PEEK), an elastomer, or other composite. Additionally, the lightweight crosshead 30 may be formed from using a molding process, a dyeing process, or other machining process. As will be appreciated, the lightweight construction of the crosshead 30 may improve the performance of the compressor 10 by enabling the operation of the compressor 10 at faster speeds. Additionally, the longevity and useful life of the crosshead 30 may be improved due to the reduced inertial load of the crosshead 30 and/or improved wear and/or corrosion resistance of lightweight materials, such as ceramics, that may be used to make the crosshead 30.

Figure 9:
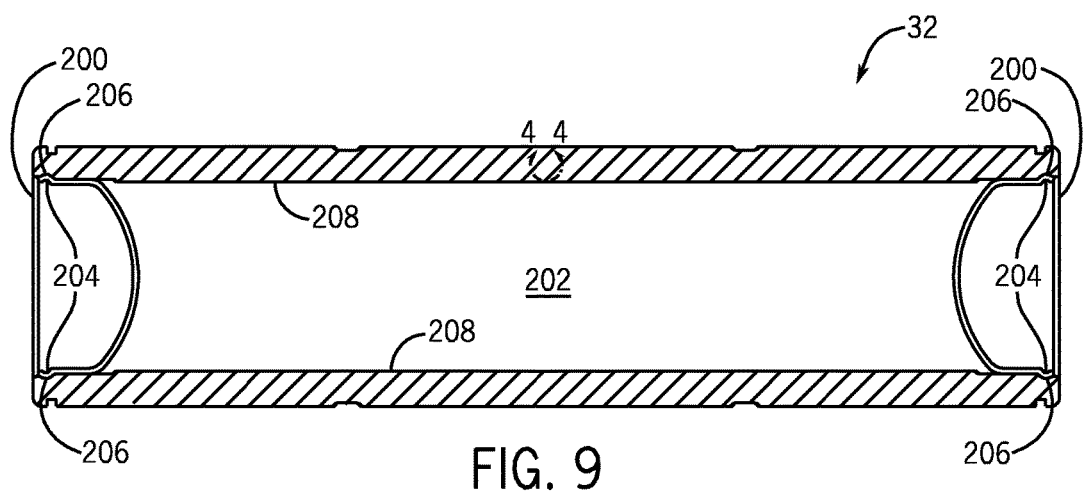
FIG. 9 is a cross-sectional side view of a crosshead pin, in accordance with embodiments of the present disclosure.

FIG. 9 is a cross-sectional side view of an embodiment of the crosshead pin 32, which may be formed from a light composite material or other lightweight material. As shown, the crosshead pin 32 has a cylindrical shape and is configured to be disposed within the second aperture 182 of the crosshead 30. In certain embodiments, the crosshead pin 32 may be formed from a lightweight material, such as a ceramic, a polyimide, a polyetheretherketone (PEEK), an elastomer, a carbon-fibrous composite, matrix-reinforced material, or other composite. The crosshead pin 32 may be formed using a machining process, such as a molding process or dyeing process. Additionally, the crosshead pin 32 includes two caps 200 disposed on either end of the crosshead pin 32, thereby enclosing a cavity 202 formed by the cylindrical shape of the crosshead pin 32. As shown, the caps include indentions 204 (e.g., annular indentions) which engage with recesses 206 formed in an inner surface 208 of the crosshead pin 32. In this manner, the caps 200 may be retained within the cavity 202 of the crosshead pin 32. In certain embodiments, the caps 200 may be formed from a metal, such as steel or aluminum. As will be appreciated, the lightweight construction of the crosshead pin 32 may improve the performance of the compressor 10 by enabling the operation of the compressor 10 at faster speeds.

Figure 10:
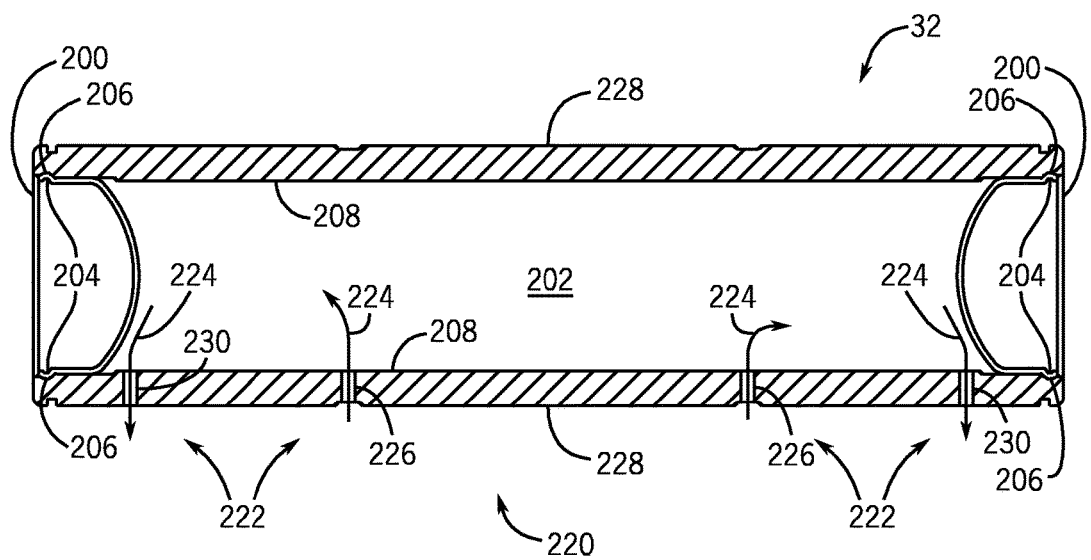
FIG. 10 is a cross-sectional side view of a crosshead pin, in accordance with embodiments of the present disclosure.

FIG. 10 is a cross-sectional side view of an embodiment of the crosshead pin 32. More specifically, the illustrated crosshead pin 32 is configured for use with the crosshead lubrication system 220. The crosshead pin 32 shown in FIG. 10 includes similar elements and element numbers as the embodiment of the crosshead pin 32 shown in FIG. 9.

Additionally, the present embodiment of the crosshead pin 32 includes ports 222 configured to flow a coolant and/or a lubricant, such as oil, represented by reference numeral 224. For example, the crosshead pin 32 includes entry ports 226, which may receive the lubricant 224 from the connecting rod 28 of the compressor 10. More specifically, the lubricant 224 may reach the entry ports 226 from a surface, port, passage, or other portion of the connecting rod 28. As shown, the entry ports 226 extend from an outer surface 228 of the crosshead pin 32 to the inner surface 208 of the crosshead pin 32. As a result, the lubricant 224 flows into the cavity of the crosshead pin 32. While the illustrated embodiment of the crosshead pin 32 includes two entry ports 226 for receiving the lubricant 224 from the connecting rod 28, other embodiments may include any suitable number of entry ports 226 extending from the outer surface 228 to the inner surface 208 of the crosshead pin 32.

Moreover, the crosshead pin 32 also includes two exit ports 230, although other embodiments of the crosshead pin 32 may include other suitable numbers of exit ports 230. From within the cavity 202 of the crosshead pin 32, the lubricant 224 flows through the exit ports 230 to the outer surface 228 of the crosshead pin 32. As mentioned above, when the crosshead pin 32 is disposed within the aperture 182 of the crosshead 30 to couple the connecting rod 28 to the crosshead 30, the crosshead 30 and the connecting rod 28 may pivot relative to one another. As a result, the crosshead pin 32 may move or rotate relative to the crosshead 30, thereby creating a bearing surface between the outer surface 228 of the crosshead pin 32 and an inner surface (inner surface 256 of FIG. 11 below) of the crosshead 30. As will be appreciated, when the lubricant 224 exits the cavity 202 of the crosshead pin 32 through the exit ports 230, the lubricant 224 may flow along the outer surface 228 of the crosshead pin 32 between the crosshead pin 32 and the crosshead 30. In this manner, the lubricant 224 may reduce friction, abrasion, and/or wear between the crosshead pin 32 and the crosshead 30, as the crosshead pin 32 and the crosshead 30 move relative to one another. Furthermore, as discussed in detail below with reference to FIG. 11, when the lubricant 224 exits the cavity 202 of the crosshead pin 32, the lubricant 224 may flow from the exit ports 230 into lubricant ports (lubricant ports 254 of FIG. 11) of the crosshead 30, from which the lubricant 224 may flow to other portions of the crosshead 30.

Figure 11:
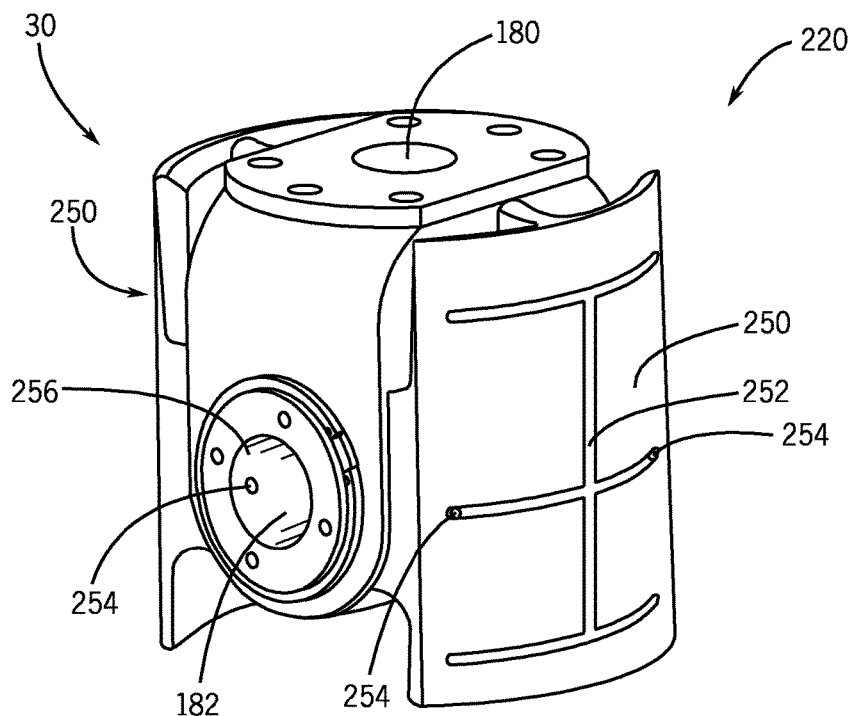
FIG. 11 is a perspective view a crosshead, in accordance with embodiments of the present disclosure.

FIG. 11 is a perspective view an embodiment of the crosshead 30. More specifically, the crosshead 30 is configured for use with the crosshead lubrication system 220. That is, the crosshead 30 may be a component of the crosshead lubrication system 220. As mentioned above, the crosshead lubrication system 220 is configured to transmit a flow of lubricant, such as oil, from a connecting rod (e.g., connecting rods 28 shown in FIG. 2) to various surfaces of the crosshead 30.

In the illustrated embodiment, the crosshead 30 includes outer surfaces 250 having recesses 252. More particularly, the recesses 252 formed in the outer surfaces 250 of the crosshead 30 are configured to receive and flow the lubricant 224, in the manner described below. In certain embodiments, the recesses 252 may be formed in the outer surfaces 250 by machining or molding. As will be appreciated, the outer surfaces 250 of the crosshead 30 are configured to abut and translate along the crosshead guides 34 of the compressor 10 during operation of the compressor 10. Therefore, as the lubricant 224 flows within the recesses 252 formed in the outer surfaces 250, the lubricant 224 may reduce friction, abrasion, and/or wear between the crosshead 30 and the crosshead guides 34, as the crosshead 30 moves along the crosshead guides 34.

As shown, the recesses 252 are indentions, canals, depressions, cavities, or other similar formations that the lubricant 224 may flow within or along. Additionally, the shape, configuration, or design of the recesses 252 in the outer surfaces 250 may vary. Furthermore, the recesses 252 are fluidly coupled to one or more ports 254 formed in the crosshead 30. More specifically, the ports 254 extend from one of the outer surfaces 250 (e.g., one of the recesses 252), and through the crosshead 30 to the aperture 182 of the crosshead 30. More specifically, the ports 254 extend to the inner surface 256 of the crosshead 30. As discussed in detail above, the crosshead pin 32 may move (e.g., rotate) relative to the crosshead 30, thereby creating a bearing surface between the outer surface 228 of the crosshead pin 32 and the inner surface 256 of the crosshead 30. Moreover, as the crosshead pin 32 moves relative to the crosshead 30, the exit ports 230 of the crosshead pin 32 may periodically align with the ports 254 of the crosshead 30. In this manner, the lubricant 224 exiting the cavity 202 of the crosshead pin 32 through the exit ports 230 may pass into the ports 254 formed in the crosshead 30. Thereafter, the lubricant 224 may travel through the ports 254 to the recesses 252 formed in the outer surfaces 250 of the crosshead 30. As the lubricant 224 flows within the recesses 252, the lubricant 224 may reduce friction, abrasion, and/or wear between the crosshead 30 and the crosshead guides 34, as the crosshead 30 moves along the crosshead guides 34.

Figure 12:
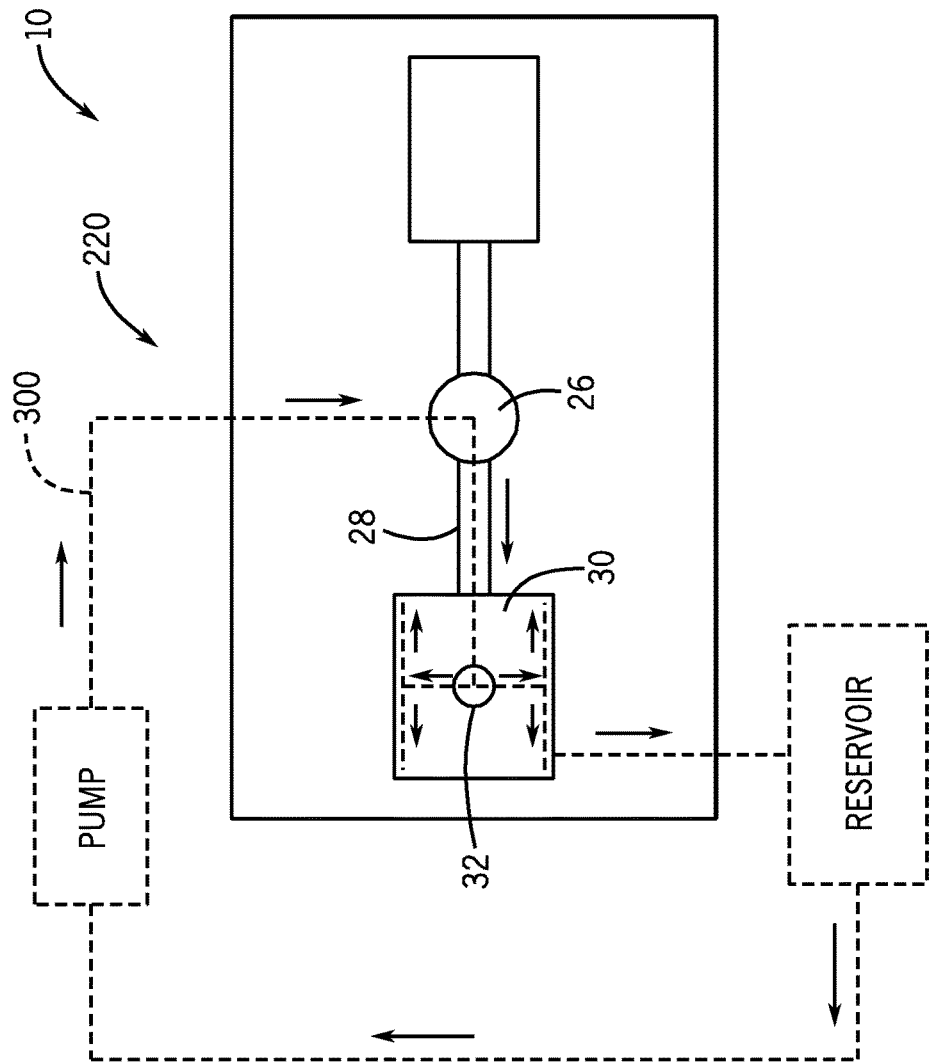
FIG. 12 is a schematic of a compressor having a crosshead lubrication system.

FIG. 12 is a schematic of the compressor 10 having the crosshead lubrication system 220, illustrating a flow path 300 of the lubricant 224. As will be appreciated, the flow path 300 of the lubricant 224 may be vary for different embodiments of the crosshead lubrication system 220. As mentioned above the lubricant 224 flows from the connecting rod 28 to the crosshead pin 32. That is, the lubricant 224 enters the crosshead pin 32 through the entry ports 226 of the crosshead pin 32. Thereafter, the lubricant 224 exits the crosshead pin 32 (e.g., the cavity 202 of the crosshead pin 32) through the exit ports 230 and enters the crosshead 30 through the ports 254 of the crosshead 30. The lubricant 224 reaches the recesses 252 formed in the crosshead 30 and lubricants the bearing surfaces between the crosshead 30 and the crosshead guides 34. After lubricating the bearing surfaces, the lubricant 224 may be collected in a reservoir 302 of the crosshead lubrication system 220. The lubricant 224 may then continue along the flow path 300 to be reused for lubrication of the crosshead 30. For example, in certain embodiments, a pump 304 may be used to circulate the flow of the lubricant 224 within the crosshead lubrication system 200. Other embodiments of the crosshead lubrication system 220 may include additional components (e.g., along the flow path 300), such as sumps, filters, and so forth.

In certain embodiments, the crosshead 30 and the crosshead pin 32 having the crosshead lubrication system 220 may be formed from the lightweight materials described above (e.g., lightweight composite materials). For example, the crosshead 30 and/or the crosshead pin 32 may be formed with the composite material 50 described above. That is, the composite material 50 may have the reinforcing material 52 distributed within the matrix material 54. For example, the matrix material may be a plastic, polymer, polyester, epoxy, polyimide, polypropylene, a polyetheretherketone (PEEK), or other matrix material. Additionally, the reinforcing material may be fibers or other particles, such as carbon, glass, ceramics, or other reinforcing material. Moreover, the crosshead 30 and/or the crosshead pin 32 having the crosshead lubrication system 220 may be formed from other lightweight materials, such as a carbon composite, a plastic, a polyetheretherketone (PEEK) material, polyimide, an elastomer such as SA4, a ceramic, a fiberglass composite, or other lightweight composite material.

The lightweight construction of the piston 36, crosshead 30, crosshead pin 32, and associated components is beneficial for a number of reasons. As discussed above, the lightweight configuration of the piston 36 enables the piston 36 to move within the piston cylinder 164 at faster speeds than a piston 36 not having a lightweight configuration. As a result, the power output of the piston cylinder system 150, e.g., the power transferred to a crankshaft, increases. Furthermore, the increase in power output due to the lightweight construction of the piston 36 may be realized without increasing the size of the piston cylinder 164. The lightweight design of the piston 36 further reduces the inertial load of the piston 36, which may increase the longevity or useful life of the piston 36. Additionally, the reduced inertial load of the piston 36 may increase the useful life of other moving components in the piston cylinder system 150, such as bearings, rings, bushings, and so forth.

Moreover, the lightweight configuration of the crosshead 30 enables the crosshead 30 to move within the compressor 10 at faster speeds than a crosshead 30 not having a lightweight configuration. As a result, the power output of the compressor 10, e.g., the power transferred to a crankshaft, increases. Furthermore, the increase in power output due to the lightweight construction of the crosshead 30 may be realized without increasing the size of the piston cylinder 164. The lightweight design of the crosshead 30 further reduces the inertial load of the crosshead 30, which may increase the longevity or useful life of the crosshead 30. Additionally, the reduced inertial load of the crosshead 30 may increase the useful life of other moving components in the compressor 10, such as bearings, rings, bushings, and so forth.

Furthermore, the crosshead lubrication system 220 enables the flow and distribution of lubricant 224 from the connecting rod 28 of the compressor 10 to the crosshead 30 and the crosshead pin 32. More specifically, the lubricant 224 may flow through ports (e.g., ports 226, 230, and 254) formed in the crosshead pin 32 and the crosshead 30 and through the recesses 252 formed in the outer surfaces 250 of the crosshead 30. As a result, abrasion, wear, and/or friction may be reduced between the crosshead 30, the crosshead pin 32, and the crosshead guides 34 as the compressor 10 operates. In other words, as the crosshead pin 32, the crosshead 30, and the crosshead guides 34 rotate, translate, or move relative to one another, abrasion, friction, and/or wear among the components may be reduced. Additionally, the crosshead 30 and the crosshead pin 32 having the crosshead lubrication system 220 may also have one or more of the lightweight configurations described above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a composite piston, comprising:
a piston body made of a composite material, wherein the composite material comprises a reinforcing material distributed in a matrix material; and
a piston ring carrier coupled to the piston body,
wherein the piston body comprises a plurality of piston body portions separate from one another, each made of the composite material, wherein the piston ring carrier is axially captured between respective outer lips of first and second body portions of the plurality of piston body portions, the respective outer lips extend in an axial direction relative to a central axis of the composite piston, the piston ring carrier axially abuts respective axial end faces of the respective outer lips of the first and second body portions of the plurality of piston body portions, a portion of each of the respective outer lips is disposed radially outward of a portion of the piston ring carrier relative to the central axis, the first body portion of the plurality of piston body portions comprises a first inner hub, the second body portion of the plurality of piston body portions comprises a second inner hub, and the first and second inner hubs axially abut one another.

2. The system of claim 1, wherein the piston body has a hollow interior, and the piston ring carrier partially defines and directly interfaces with the hollow interior.

3. The system of claim 2, wherein the piston body comprises at least one stiffening rib along the hollow interior.

4. The system of claim 1, wherein the reinforcing material comprises a plurality of particles.

5. The system of claim 1, wherein the reinforcing material is different than the matrix material.

6. The system of claim 1, wherein the matrix material comprises a plastic, polymer, polyester, epoxy, polyimide, or polypropylene, and the reinforcing material comprises a carbon, glass, or ceramic.

7. The system of claim 1, wherein the piston ring carrier is formed made of a metal.

8. A system, comprising:
a composite piston, comprising:
a first body portion made of a first composite material;
a second body portion made of a second composite material, wherein the first body portion and the second body portion are separate from one another, the first and second body portions each include respective outer lips, and the respective outer lips extend in an axial direction relative to a central axis of the composite piston; and
a piston ring carrier axially captured between the respective outer lips of the first and second body portions, wherein the piston ring carrier axially abuts respective axial end faces of the respective outer lips of the first and second body portions, a portion of each of the respective outer lips is disposed radially outward of a portion of the piston ring carrier relative to the central axis, the first body portion comprises a first inner hub, the second body comprises a second inner hub, and the first and second inner hubs axially abut one another.

9. The piston of claim 8, wherein first and second composite materials each comprise a plurality of reinforcing particles distributed in a matrix material.

10. The piston of claim 9, wherein the matrix material comprises a plastic, polymer, polyester, epoxy, polyimide, or polypropylene.

11. The piston of claim 9, wherein the plurality of reinforcing particles comprises a carbon, glass, or ceramic.

12. The piston of claim 8, wherein the first and second composite materials are the same as one another.

13. The piston of claim 8, comprising a piston rod made of a third composite material.

14. The piston of claim 8, wherein the piston ring carrier made of a metal.

15. The system of claim 8, wherein the first body portion comprises a first annular cavity, the second body portion comprises a second annular cavity, and the first and second annular cavities cooperatively form a hollow portion of the composite piston.

16. The system of claim 15, wherein the respective outer lips and the piston ring carrier partially define and directly interface with the hollow portion of the composite piston.

17. A system, comprising:
a composite piston, comprising:
a hollow piston body made of a first material, wherein the hollow piston body comprises a first body portion and a second body portion, wherein the first and second body portions are separate pieces, wherein the first body portion comprises a first inner hub, the second body comprises a second inner hub, and the first and second inner hubs axially abut one another, and wherein the first and second body portions each include respective outer lips, and the respective outer lips extend in an axial direction relative to a central axis of the composite piston; and a piston ring carrier made of a second material different from the first material, wherein the piston ring carrier is axially captured between the respective outer lips of the first and second body portions of the hollow piston body, the piston ring carrier axially abuts respective axial end faces of the respective lips of the first and second body portions of the hollow piston body, a portion of each of the respective outer lips is disposed radially outward of a portion of the piston ring carrier relative to the central axis, and wherein the first material comprises a first composite material; and a composite piston rod made of a third material.

18. The system of claim 17, wherein the first composite material comprises a plurality of reinforcing particles distributed in a matrix material.

19. The system of claim 17, wherein the third material comprises a second composite material having a plurality of reinforcing particles distributed in a matrix material.

20. The system of claim 17, wherein the first body portion comprises a first annular cavity, the second body portion comprises a second annular cavity, and the first and second annular cavities cooperatively form a hollow portion of the hollow piston body, and wherein the piston ring carrier partially defines and directly interfaces with the hollow portion.

* * * * *